United States Patent
Dogramadzi et al.

(10) Patent No.: US 10,598,499 B2
(45) Date of Patent: Mar. 24, 2020

(54) METHOD AND DEVICE FOR ACCELERATED MAP-MATCHING

(71) Applicant: Kabushiki Kaisha Toshiba, Minato-ku (JP)

(72) Inventors: Marko Dogramadzi, Bristol (GB); Aftab Khan, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 100 days.

(21) Appl. No.: 16/045,121

(22) Filed: Jul. 25, 2018

(65) Prior Publication Data

US 2020/0033139 A1   Jan. 30, 2020

(51) Int. Cl.
| | | |
|---|---|---|
| *G01C 21/32* | (2006.01) | |
| *G01S 19/45* | (2010.01) | |
| *G06F 16/29* | (2019.01) | |

(52) U.S. Cl.
CPC .............. *G01C 21/32* (2013.01); *G01S 19/45* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 9,519,643 B1* | 12/2016 | Nakagiri | ............... | G06F 17/2223 |
| 10,024,673 B1* | 7/2018 | Zhang | ..................... | G01S 19/42 |
| 2005/0111592 A1* | 5/2005 | Yee | ........................ | H04L 1/0048 |
| | | | | 375/341 |
| 2005/0246334 A1* | 11/2005 | Tao | ........................ | G01S 5/0252 |
| 2009/0098547 A1* | 4/2009 | Ghosh | .................... | G16B 20/10 |
| | | | | 435/6.16 |
| 2013/0041623 A1* | 2/2013 | Kumar | ................... | G01C 21/14 |
| | | | | 702/158 |
| 2013/0094831 A1* | 4/2013 | Suzuki | ............... | H04N 21/8456 |
| | | | | 386/230 |
| 2014/0244154 A1* | 8/2014 | Modica | .............. | G01C 21/3407 |
| | | | | 701/410 |
| 2014/0300776 A1* | 10/2014 | Wu | .................... | H04M 1/72572 |
| | | | | 348/231.5 |

(Continued)

FOREIGN PATENT DOCUMENTS

| | | | |
|---|---|---|---|
| CN | 106595680 A | * | 4/2017 |
| CN | 107742126 A | * | 2/2018 |

*Primary Examiner* — Shelley Chen
(74) *Attorney, Agent, or Firm* — Oblon, McClelland, Maier & Neustadt, L.L.P.

(57) ABSTRACT

A computer implemented method of matching a series of geolocation measurements to a map using a Viterbi algorithm by determining transition probabilities between pairs of candidate points for consecutive geolocation measurements. The map comprises a plurality of paths. The method comprises segmenting the map into a plurality of segments and, when a distance of the consecutive geolocation measurements is less than or equal to a segment length, determining the transition probability between two candidate points based on a Euclidian distance between the two candidate points and a route distance between the two candidate points. The route distance is equal to the Euclidean distance plus a first predetermined value when the two candidate points are not in the same segment as each other.

13 Claims, 9 Drawing Sheets

(56) References Cited

U.S. PATENT DOCUMENTS

| | | | | |
|---|---|---|---|---|
| 2016/0150361 A1* | 5/2016 | Zhu | ............... | H04L 63/1491 |
| | | | | 455/456.1 |
| 2016/0377440 A1* | 12/2016 | Dorum | ............. | G08G 1/0112 |
| | | | | 702/150 |
| 2017/0241787 A1* | 8/2017 | Trigoni | ............. | G01C 21/12 |
| 2017/0314938 A1* | 11/2017 | Wang | ............. | G01C 21/30 |
| 2018/0182238 A1* | 6/2018 | Fowe | ............. | G08G 1/065 |
| 2018/0286220 A1* | 10/2018 | Fowe | ............. | B60W 30/0953 |
| 2019/0204096 A1* | 7/2019 | Cai | ............. | G01C 21/32 |
| 2019/0301876 A1* | 10/2019 | Fryer | ............. | G08G 1/20 |
| 2019/0346572 A1* | 11/2019 | Fowe | ............. | G01C 21/32 |
| 2019/0360818 A1* | 11/2019 | Linder | ............. | G06F 16/29 |
| 2019/0360819 A1* | 11/2019 | Mao | ............. | G01C 21/32 |

\* cited by examiner

US 10,598,499 B2

METHOD AND DEVICE FOR ACCELERATED MAP-MATCHING

FIELD

Embodiments described herein relate generally to computationally efficient ways of determining a position in a map.

BACKGROUND

Over recent times the number of devices that possess the ability to generate position information has increased considerably, in part due to the ubiquitous availability of geolocation sensors that operate with the Global Positioning System network of satellites. As a consequence geolocation information is routinely used in most, if not all, navigation applications. Despite its widespread adoption, relying solely on geolocation measurements for position information can prove problematic, particularly when navigating in a changing wireless environment.

As a result of the accuracy limitations of positioning systems it is foreseeable that the position of the geolocation measurement will not be the true position of the user, but instead will be within an error region of the true position. This lack of accuracy can be particularly problematic in applications where accurate positioning is required in order to determine directions or navigate in a densely populated area.

Arrangements of the present invention will be understood and appreciated more fully from the following detailed description, made by way of example only and taken in conjunction with drawings in which.

DETAILED DESCRIPTION

Figure 1A:
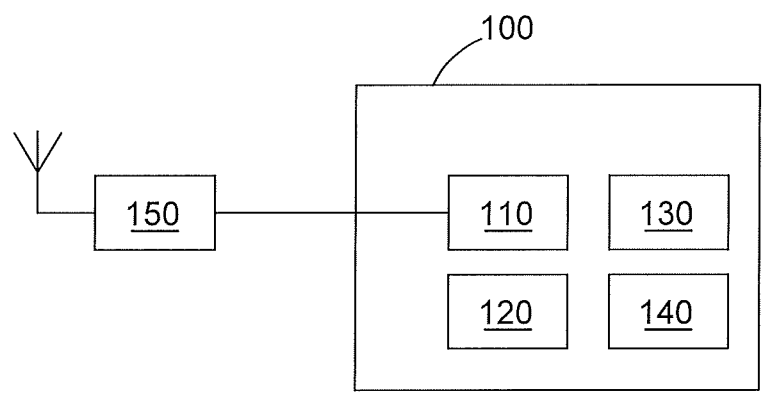
FIG. 1A shows a device according to an embodiment.

According to an embodiment there is provided a computer implemented method of matching a series of geolocation measurements to a map using a Viterbi algorithm by determining transition probabilities between pairs of candidate points for consecutive geolocation measurements. The map comprises a plurality of paths. The method comprises segmenting the map into a plurality of segments and, when a distance of the consecutive geolocation measurements is less than or equal to a segment length, determining the transition probability between two candidate points based on a Euclidian distance between the two candidate points and a route distance between the two candidate points. The route distance is equal to the Euclidean distance plus a first predetermined value when the two candidate points are not in the same segment as each other.

The geolocation measurements may be GPS points.

When consecutive geolocation measurements are spaced apart further than the segment length the route distance may be calculated by following the plurality of paths of the map between the two candidate points and accumulating the followed path distance.

The first predetermined value may equal a second predetermined value when the two candidate points are in adjacent segments and/or equals a third predetermined value when the two candidate points are not in adjacent segments. The third predetermined value is larger than the second predetermined value.

The route distance may be equal to the Euclidean distance when the two candidate points are in the same segment.

Each segment of the plurality of segments may have a segment length that is based on a maximum speed of a user and a geolocation measurement sample rate. The maximum speed of the user may be the maximum measure speed at which the user progresses across the map or may, alternatively, be a maximum permissible speed, such as an official speed limit applicable to a current section of the map.

The second predetermined value may be equal to the segment length and/or the third predetermined value may be equal to ten times the segment length.

A candidate point may be determined by finding the closest point in a segment to a geolocation measurement.

The closest point in each segment of the plurality of segments may be determined only for segments that are less than a predetermined distance from the geolocation measurement.

Determined positions associated with the geolocation measurements may be output. The positions may be output to a display, for example by overlaying the positions over the map so as to display the determined travelled route.

The geolocation measurements may be determined individually by the device performing the method or may be individually or as a batch be received by a device performing the method. The latter may, for example, be the case in a computing device that receives a batch of geolocation measurements for the purpose of retrospectively analysing a travelled path.

A plurality of probabilities, hereinafter referred to as measurement probabilities, may further be calculated for each candidate point of the plurality of candidate points. The probabilities indicate the likelihood that a candidate point is a true location of its respective geolocation measurement; A most likely position in the map may be determined based on the measurement probabilities and the transition probabilities.

A series of map matched geolocation measurements may be output for analysis.

According to another embodiment there is provided a device comprising a processor and memory. The memory stores computer program instructions executable by the processor and, when executed by the processor, causes the processor to match a series of geolocation measurements to a map using a Viterbi algorithm by determining transition probabilities between pairs of candidate points for consecutive geolocation measurements. The map comprises a plurality of paths. The code is configured to cause the processor to segment the map into a plurality of segments and, when a distance of the consecutive geolocation measurements is less than or equal to a segment length, determine the transition probability between two candidate points based on a Euclidian distance between the two candidate points and a route distance between the two candidate points. The route distance is equal to the Euclidean distance plus a first predetermined value when the two candidate points are not in the same segment as each other.

According to another embodiment there is provided a non-transitory medium comprising computer program instructions suitable for execution by a processor, the instructions configured to, when executed by the processor, perform a method as described above.

In order to reduce the effect of any errors in positioning a technique called map matching is used. In general terms, map matching improves the positional accuracy of a system by integrating geolocation information with the spatial features or topology of a map. Map matching can take many forms, in an automotive application for example, a selection of sequential geolocation measurements are mapped to an allowed pathway, i.e. a road, thereby enabling accurate positioning and navigation instructions to be provided to the user.

One way of implementing map matching is through the use of a hidden Markov model (HMM) and the Viterbi algorithm. This approach works by associating each geolocation measurement with a plurality of candidate points on the road network. Each candidate point represents a potential true position of the vehicle on the road and has a probability of the candidate point being the true position of the vehicle associated with it. This probability is referred to as a measurement probability. The measurement probability is calculated such that a candidate point that is located closer to the geolocation measurement has a higher probability value associated with it than a candidate point that is positioned further away.

As the vehicle traverses the road a number of geolocation measurements will be obtained, each geolocation measurement having a plurality of candidate points associated with it on the road network. In order to determine the most likely route through the road map it is necessary to determine the probability of each possible transition between all the associated candidate points of the geolocation measurements. The probability of each transition is referred to as the transition probability and represents the likelihood of a candidate point of one geolocation measurement following a candidate point of the previous geolocation measurement. Each candidate point represents a possible position of the vehicle on the road network and the transition probability between two candidate points represents the likelihood that the vehicle travelled between these points. As you may expect, the value of the transition probability between two candidate points on the same network is higher than the value of the transition probability between two adjacent roads since it is unlikely that a vehicle would have driven to a position on an adjacent road without a navigable path (i.e. a road) existing between the two candidate points.

The value of the transition probability between two candidate points is based on the difference between the Euclidean distance and the routing distance. Unlike the Euclidean distance, which represents the straight line distance between two points, the routing distance represents the distance between candidate points when following the roads, or paths, within the map. As an example two candidate points on adjacent roads would have a small Euclidean distance as they are geographically close to each other however their routing distance is large since the vehicle would have to drive back to a junction along the current road and then drive from the junction to the candidate point along the adjacent road.

This approach produces highly accurate results. However, this requires a substantial amount of computing resource. This is, in part, due to the method itself. Traditional approaches to map matching using a hidden Markov model require a large number of calls to a routing function in order to determine the probability of one candidate point being a successor to a previous candidate point. This routing function is computationally expensive and can require a large amount of memory, particularly when the roadmap is complex such as within cities. For this reason a different approach to map matching is required.

FIG. 1A shows a device 100 according to an embodiment. The device comprises an input port 110, a microprocessor 120, a non-volatile memory 130 and an output port 140. The input module 110 is communicatively connected to a geolocation module 150. The geolocation module 150 generates and transmits geolocation measurements to the microprocessor 120 via the input port 110. The microprocessor 120 is coupled to non-volatile memory 130. Memory 130 stores computer program instructions that, when executed, cause the processor 120 to execute program steps that implement the above described method on the basis of geolocation measurements received from the geolocation module 150. The processor 120 is also coupled to the output port 140 that is configured to communicate position information to outside entities.

The geolocation module 150 of FIG. 1A may optionally be coupled to an antenna. In one embodiment the geolocation module generates geolocation measurements using the Global Positioning System (GPS) network. In other embodiments the geolocation module generates geolocation measurements using different means such as compass readings or means of triangulating signals from Wi-Fi base stations and cell towers. Whilst in the embodiments described above the geolocation module 150 is shown to be situated outside of, but connected to, the device 100 it will be appreciated that in other embodiments the geolocation module 150 forms part of the device 100.

Figure 1B:
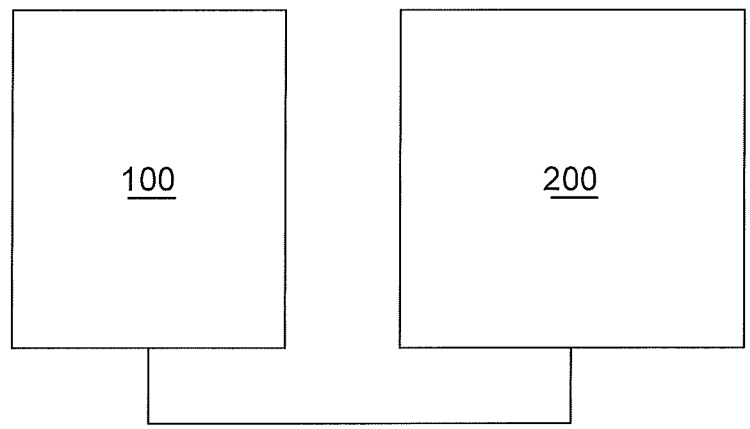
FIG. 1B shows a system comprising the device communicatively connected to a computing system.

FIG. 1B shows a system comprising the device 100, communicatively connected to a computing system 200. In an embodiment the connection between the two systems is established via the output port 150 of the device 100. The computing system 200 may, in one embodiment, be part of an on-board computing system of a vehicle, with the device 100 receiving position information and determining the location of a vehicle within a road network. By determining the location of the vehicle in a road network the computing environment 200 can display accurate position information and generate navigation instructions, thereby enabling an operator to navigate to a desired destination.

In one embodiment the computing system 200 and the device 100 are integrated in a mobile phone, within wearable technologies or more generally in a low power device with reduced memory and/or processor capabilities. In this embodiment the device 100 communicates, via the output port 140, map matched data for the system 200 to display. Integrating the computing system 200 and the device 100 in a portable system such as a mobile phone has a number of uses, not least in pedestrian navigation. By using a device that is capable of providing accurate positioning within a map, the computing system 200 is able to inform the user of their position on a street, thereby enabling accurate on-street navigation.

Other uses in vehicular environments are of course also possible. In one embodiment the computing system 200 may be part of a traffic analysis system. By accurately and efficiently identifying the path travelled by a user the computing system 200 can identify the relative usage of different roads in the network, thereby enabling vehicle-driving pattern analysis, the scheduling of repair and maintenance as well as the planning of infrastructure upgrades.

In a further embodiment the computing system 200 and the device 100 are part of a traffic prediction system where map matching is performed on a large number of users at once. This application, especially, benefits from the increased computational efficiency of the accelerated method of map matching according to the embodiments described herein.

The above described method could also be used as part of method for finding on-street parking which can be particularly challenging in congested urban areas. Instead of requiring specific sensors for monitoring the occupancy of parking bays the above described method can be used along with other sensor data found in a smart phone such as accelerometer and magnetometer sensors to detect parking activity. Thereby enabling a system to accurately locate parking spaces within a map, and in conjunction with the other sensor data, alert a user to the presence of a vacant parking space.

Despite the above embodiments relating to pedestrian and automotive navigation there are a number of other applications including, but not limited to, any application where accurate position information is required in an environment comprising paths that restrict a user's ability to freely traverse the map.

Figure 2:
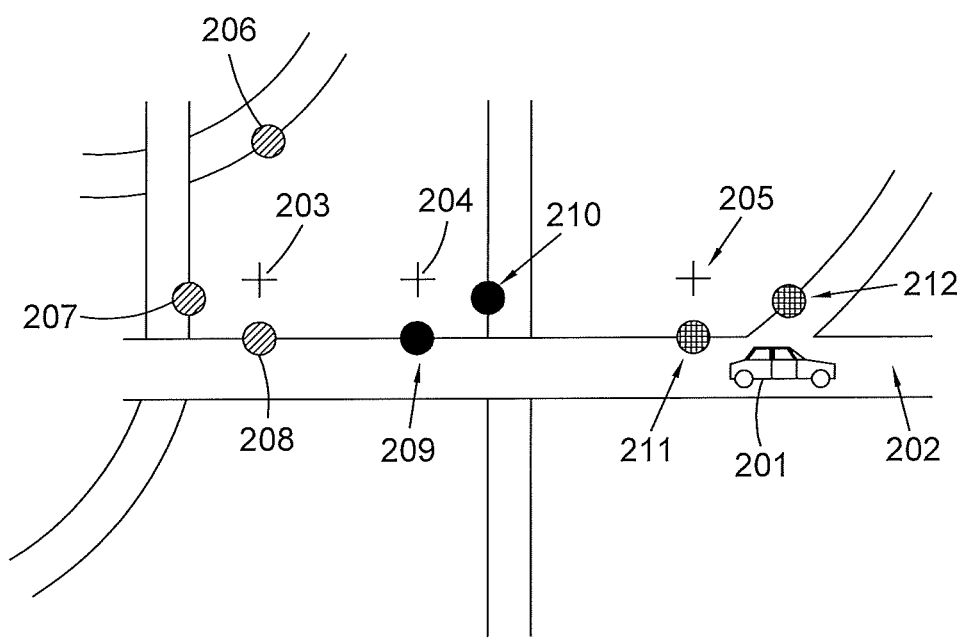
FIG. 2 shows a series of consecutive geolocation measurements superimposed on a road map.

FIG. 2 shows a series of consecutive geolocation measurements superimposed on a road map. FIG. 2 shows a vehicle 201 which is travelling along a road 202. The vehicle 201 is equipped with a sensor that generates geolocation measurements at regular intervals. At time interval $t_1$ the measured location of the vehicle 201 was the first geolocation measurement 203. At a later time, $t_2$, the measured location of the vehicle 201 was the second geolocation measurement 204. At a later time, $t_3$ the location of the vehicle was the third geolocation measurement 205. In FIG. 2 each geolocation measurement 203, 204, 205 has a corresponding set of candidate points or projections, which represent the possible true location of the vehicle 201. Candidate points are determined by finding the closest point on each of the roads that are within a predetermined distance of the geolocation measurement. The first geolocation measurement 203 has candidate points 206, 207 and 208. The second geolocation measurement 204 has candidate points 209 and 210. The third geolocation measurement 205 has candidate points 211 and 212.

In each case FIG. 2 shows the geolocation measurement deviating from the true position of the vehicle 201 on the road 202 as a result of the inherent measurement inaccuracies. One way of reducing the effect of these errors and accurately determine the true position of a user in a map is to use a probabilistic approach such as a map-matching algorithm based on a hidden Markov model (HMM).

Figure 3:
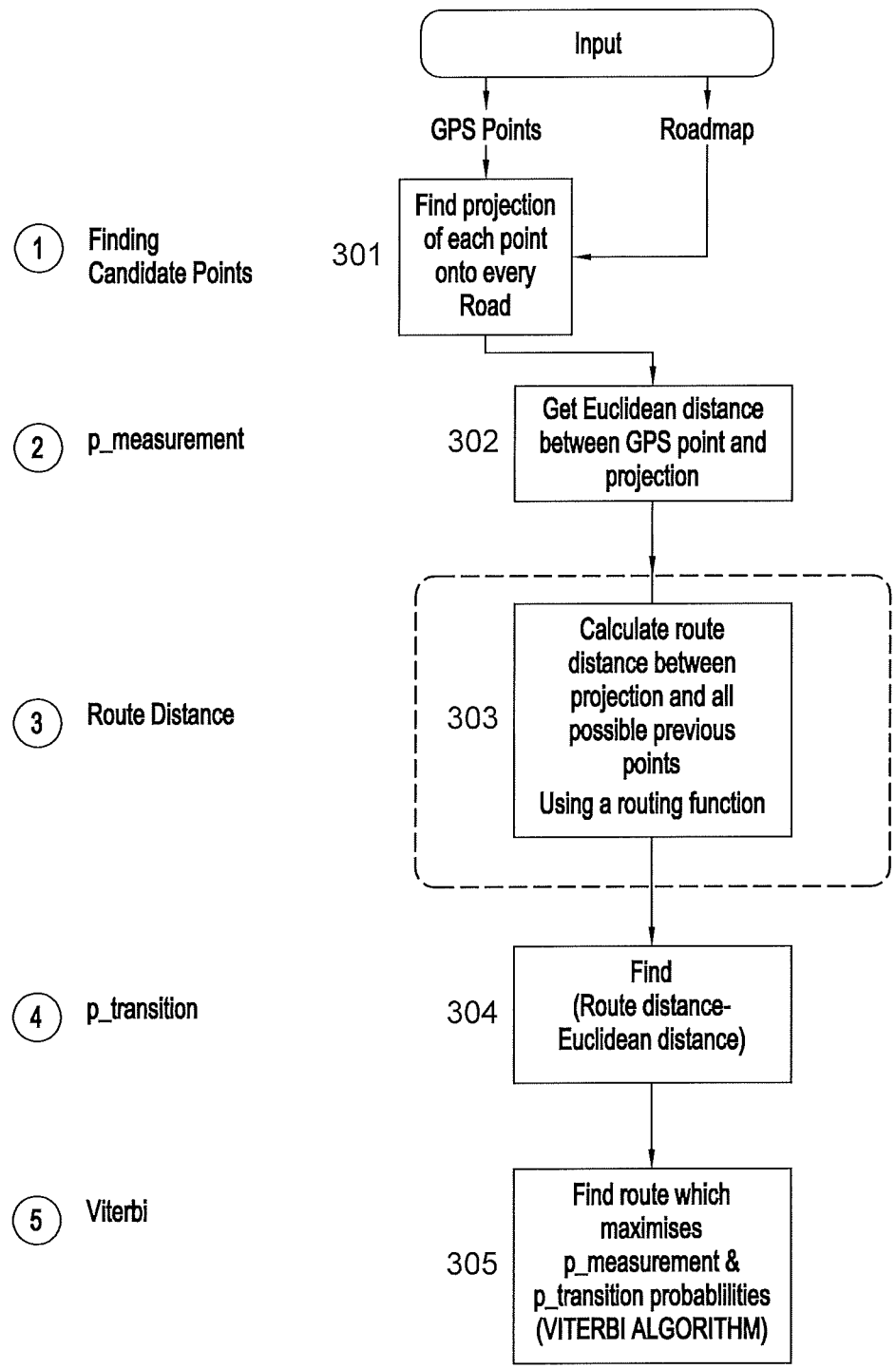
FIG. 3 shows a known method of map matching using a hidden Markov model.

FIG. 3 shows a known method of map matching using a hidden Markov model. The method shown in FIG. 3 begins in step 301 by finding a projection of each point onto every road in the map that is within a predetermined distance of the geolocation measurement. After finding the candidate points for a geolocation measurement the method obtains the Euclidean distance (i.e. the straight-line distance) between the geolocation measurement and each of its candidate points 302. The Euclidean distance between a geolocation measurement and one of its candidate points is subsequently used to determine the measurement probability: p_measurement associated with that candidate point. The measurement probability, p_measurement, represents the likelihood that a candidate point is the true location of a corresponding geolocation measurement and is one of the two probabilities which are used to determine the true position of the vehicle in the map. The probability p_measurement increases with decreasing Euclidian distance between the candidate point and the geolocation measurement. In one embodiment p_measurement ($p_m$) is calculated in the following manner:

$$p_m = \frac{1}{\sigma} e^{-\frac{d_m}{\sigma}}$$

where $d_m$ is the Euclidean distance between the GPS point and the candidate point, and $\sigma$ is the standard deviation of GPS measurement noise. On an embodiment the value of $\sigma$ calculated in Newson P. and Krumm J. "Hidden Markov map matching through noise and sparseness", International Conference on Advances in Geographic Information Systems, (2009), pp. 336 (the entirety of which is incorporated herein by this reference) to be just over 4 meters is used. In other embodiments other values of $\sigma$ may be used.

After assigning each candidate point a measurement probability the probability of a vehicle transitioning between the candidate points is considered. In step 303 the method calculates a route distance by finding the distance, following the roads of the map, between each candidate point associated with the current geolocation measurement and each candidate point associated with the previous geolocation measurement. The method subsequently determines the difference between the route distance and the Euclidean distance 304 for these transitions in order to determine the transition probability: p_transition.

p_transition represents the likelihood of a transition from a candidate point of the previous geolocation measurement to a candidate point of the current geolocation measurement and is calculated by finding the difference between the Euclidean distance and the routing distance (the distance which follows the topology of the road network) for a transition. p_transition probability is high if the difference between routing and Euclidian distance is close to 0 as this suggests that the points are on the same road section. Conversely, p_transition is low when the difference between routing and Euclidian distance is high. This can, for example, be the case when the two points are on parallel roads. In this case the Euclidean distance can be very small, whereas the routing distance can be considerably larger. The smaller the difference between these two distances, the higher the probability of transition. For example, two candidate points on the same section of road will have a smaller difference between these two distances and therefore a higher associated transition probability compared to two candidate points on parallel roads which will have a higher difference between the Euclidean and the routing distance and will therefore have a lower probability associated with this transition. In one embodiment p_transition ($p_t$) is calculated in the following manner:

$$p_t = \frac{1}{\beta} e^{-\frac{d_t}{\beta}}$$

where $d_t$ is the magnitude of the difference between the Euclidian distance and the routing distance and $\beta$ is 2. The magnitude of $\beta$ is not critical, however, and other values for $\beta$ can be chosen.

In step 305 the method concludes by determining a route through the candidate points which maximises p_measurement and p_transition probabilities. One known way of obtaining the most probable path given these probabilities is by using the Viterbi Algorithm. In step 305 the most likely path through the candidate points is determined based on the measurement and transition probabilities associated with the candidate points of a number of geolocation measurements. Using a plurality of geolocation measurements when determining the most probable path prevents a position in the map being determined based on one measurement probability alone and instead enables the route to be considered holistically. This is advantageous since there can be instances where considering only one transition may give an incorrect position indication which could only be appreciated in hindsight when considering subsequent transitions.

Figure 4:
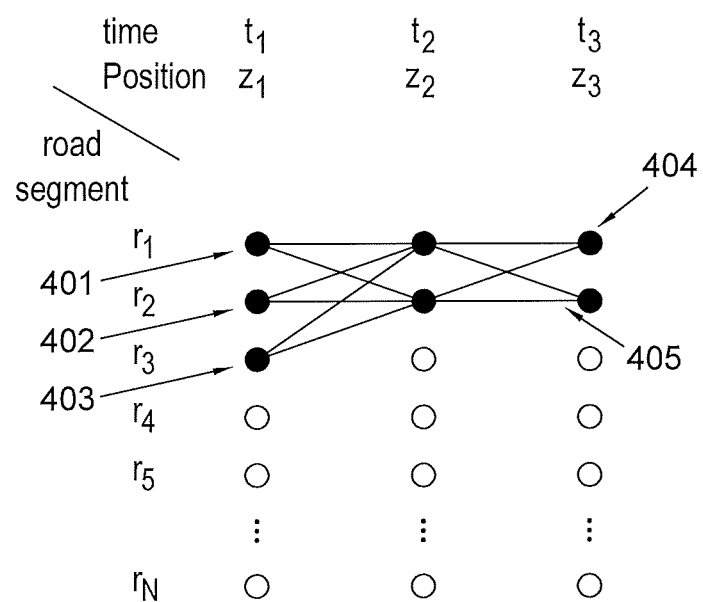
FIG. 4 shows a trellis graph representation of the measurement and transition probabilities generated in the known method of map matching.

FIG. 4 shows a trellis graph representation of the measurement and transition probabilities generated in the known method of map matching. FIG. 4 shows a trellis graph where the nodes of the trellis graph 401, 402, 403, correspond to the candidate points 206, 207, 208 of the first geolocation measurement 203 shown in FIG. 2. The nodes of the trellis graph; 401, 402, 403, 404, each have a probability, p_measurement, associated with them and the state transitions 405 shown in the trellis graph of FIG. 4 have a probability, p_transition, associated with them and represent the likelihood that a user travels between the candidate points in question.

Performing map matching in the manner described above requires the repeated use of a routing function in order to determine the probability of a candidate point for the current geolocation measurement being a successor to a candidate point of the previous geolocation measurement. This routing function is computationally intensive and repeated use can be inefficient, particularly where there are a large number of data points to analyse or when the roadmap is complex such as within cities.

Figure 5:
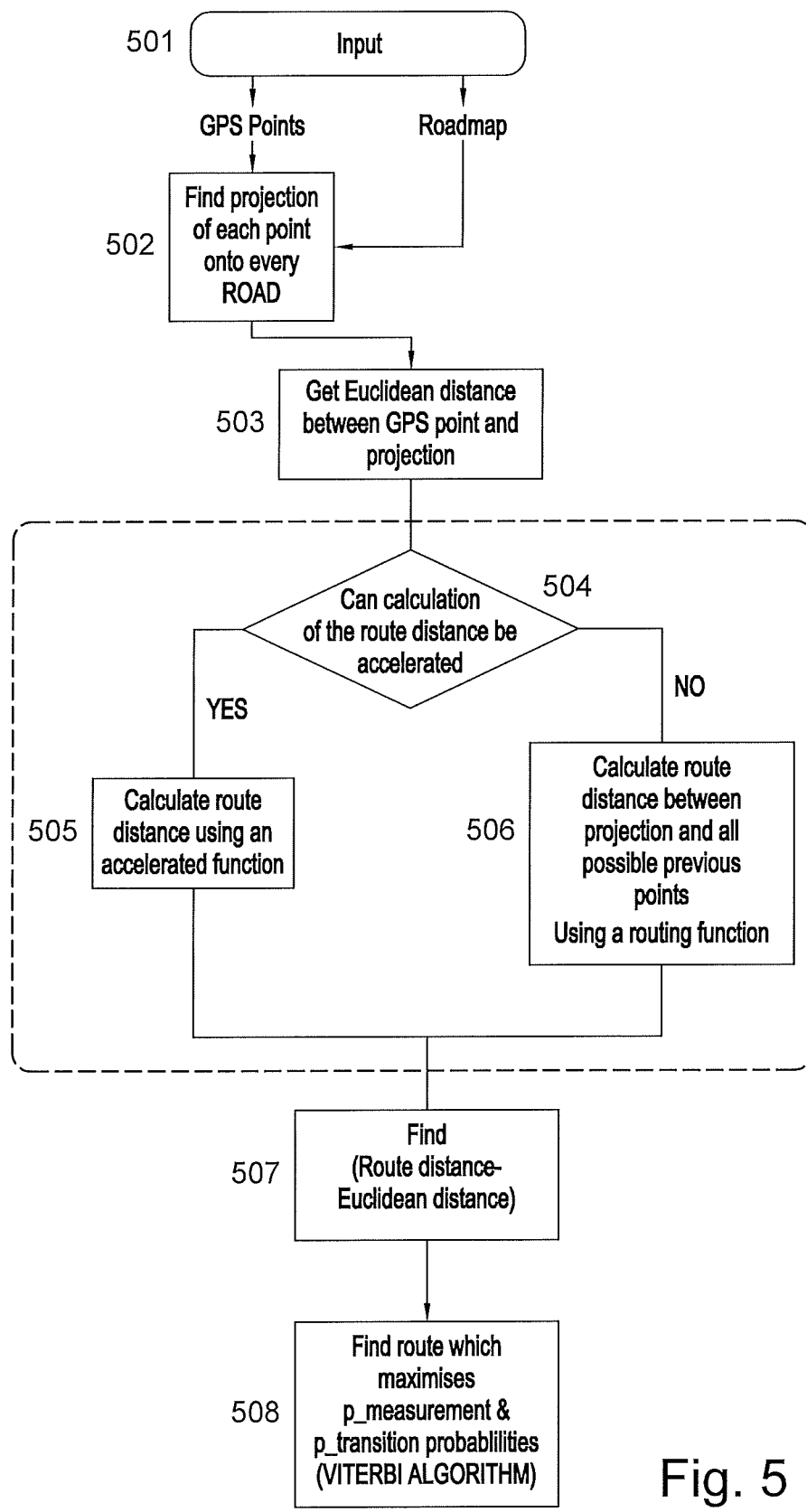
FIG. 5 shows an accelerated method of map matching using a hidden Markov model according to an embodiment.

FIG. 5 shows an accelerated method of map matching using a hidden Markov model according to an embodiment. FIG. 5 shows a method of map matching using a weighted hidden Markov model. The accelerated method of map matching begins in step 501 where the same inputs as were used for the known method of FIG. 3 are used (i.e. the geolocation points and a road map). In step 502 a projection of each geolocation measurement onto every road in the map is determined by finding the closest point to the geolocation measurement on each road that is within a predetermined distance. In certain embodiments the projections are generated by only considering roads in the map that are within a predetermined distance of the geolocation measurement.

In step 503 the Euclidean distance between the geolocation measurement and each of its associated candidate points (or projections) is calculated. In step 504 the ability to accelerate the calculation of a route distance is determined. If the calculation of a route distance can be accelerated, the route distance is calculated using an accelerated function 505. If the calculation of the route distance cannot be accelerated then the calculation of the route distance is performed using a routing function 506 in accordance with the known method discussed above. The difference between the route distance and the Euclidean distance is subsequently calculated in step 507 and the route between the candidate points of the geolocation measurements which maximises p_measurement and p_transition is determined in step 508.

Unlike the method of FIG. 3, an accelerated function is used in step 505 of FIG. 5 to determine the route distance. An accelerated function could comprise any means for weighting the transition probability; p_transition. By using an accelerated function the method of map matching can be optimised to reduce the computational complexity and the resource requirement. In an embodiment the accelerated function comprises a means of generating the route distance without using a routing function, for example the route distance may be selected from a number of predetermined values based on the position of geolocation measurements in the map. Calculating the routing distance in this way makes the transitions between candidate points appear more or less likely relative to each other without the need to calculate the absolute route distance using a routing function.

For example, consider the example discussed above where the candidate point of one geolocation measurement is on an adjacent road to the candidate point of a previous geolocation measurement. In this example the inventors have realised that it is not necessary to calculate the absolute routing distance in order to generate a representative transition probability, all that is required is a distance which makes this transition appear unlikely relative to other possible transitions. In this way the map matching method can be optimised to take into account behavioural information, such as how a user normally drives in a road network, which would not be normally considered when using the route distance and the Euclidean distance alone.

One way of accelerating the method of map matching to take into account behavioural information is to adapt the map and weigh the transition probabilities between candidate points according to an adapted map.

Figure 6:
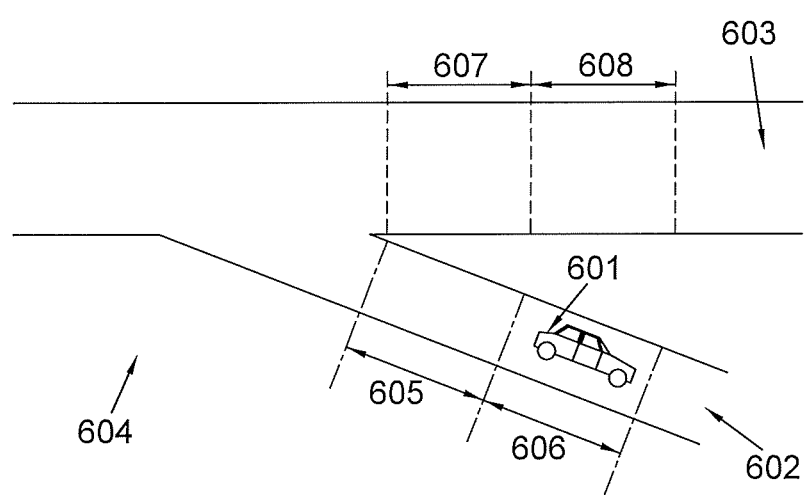
FIG. 6 shows an adapted map of a road network according to one embodiment.

FIG. 6 shows an adapted map of a road network according to one embodiment. FIG. 6 shows a vehicle 601 travelling on a road 602 which is part of a road network 604 comprising an adjacent road 603. The roadmap 604 is split into segments 605, 606, 607, 608. Each segment represents an area of a road that has been divided such that every possible point on the road is covered by only one segment.

In FIG. 6 the length of segments 605, 606, 607 and 608 is chosen such that geolocation measurements are routinely less than one segment length apart. The segment length is determined based on the maximum expected distance between geolocation measurements which in one embodiment is calculated from the maximum expected speed of a user and the sample rate of geolocation measurements.

As an example, based a maximum speed of 70 miles per hour (approximately 30 metres per second) and a geolocation measurement sampling rate of 1 Hertz (1 sample per second), it can be assumed that most geolocation points will lie within 30 metres of each other, therefore the maximum segment length is chosen as 30m. Of course, the maximum segment length does not have to equal the expected distance between geolocation measurements, it could instead be a multiple of the expected distance or equally the segment length could be the expected distance plus a predetermined margin. Once an adapted roadmap has been generated, the calculation of route distances can be optimised to utilise accelerations based on properties of the adapted map.

Figure 7:
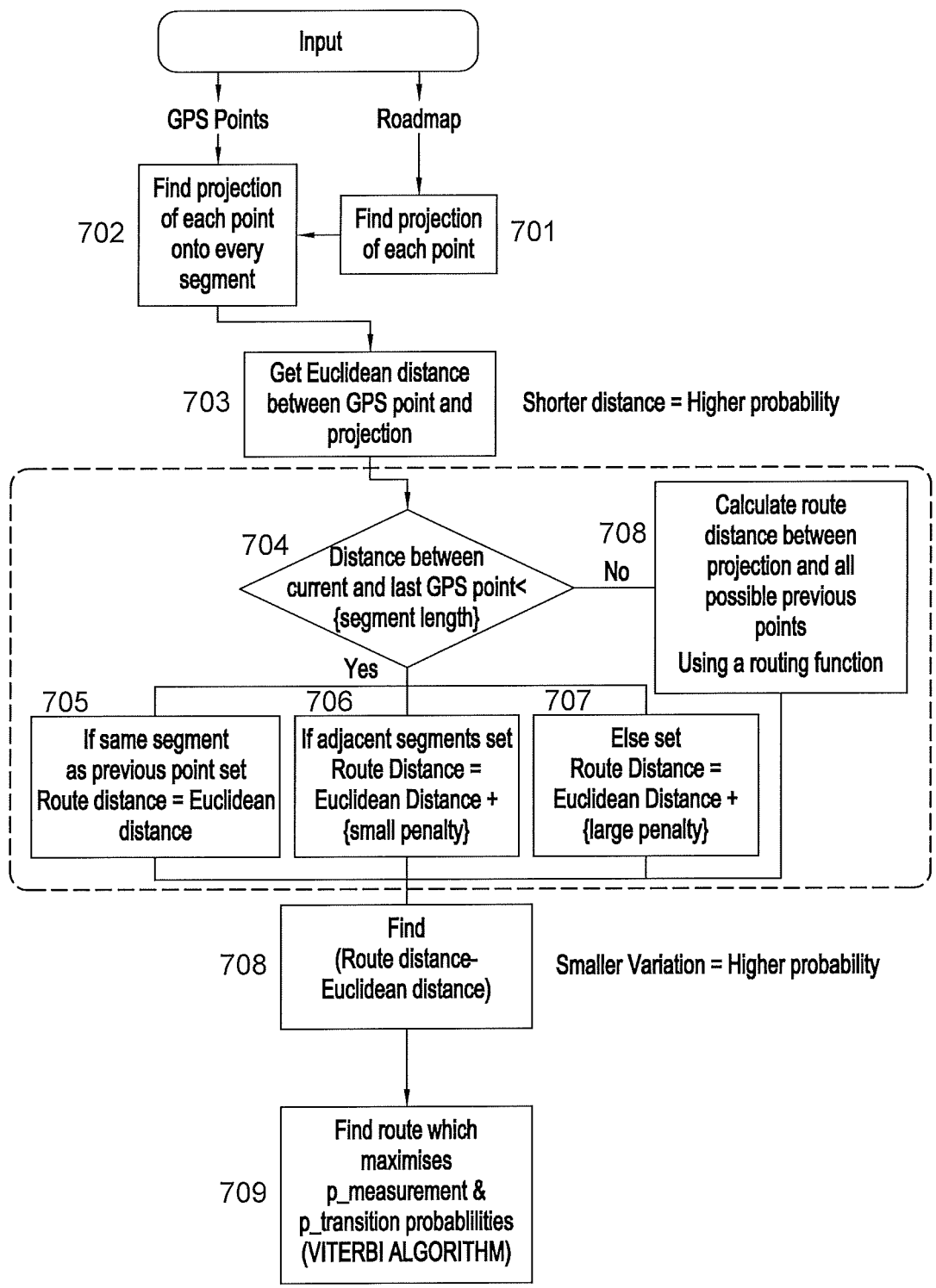
FIG. 7 shows a method of accelerated map matching according to an embodiment.

FIG. 7 shows a method of accelerated map matching according to an embodiment. In step 701 the road map is first divided into segments based on a predetermined maximum segment length. The method subsequently determines candidate points for each geolocation measurement by finding projections of each geolocation point onto every segment in the map. In step 702 candidate points are determined by finding the closest point in each segment to the geolocation measurement, for example, a geolocation point that lies between two parallel roads will have a candidate point in the segments of each parallel road. In certain embodiments candidate points are only generated for segments that are less than a threshold distance away from the geolocation measurement, thereby reducing the number of candidate points and the associated number of state transitions that need to be assessed. The method subsequently generates the measurement probability p_measurement in step 703 by using the Euclidean distance between the geolocation measurement and the relevant candidate point.

After determining the measurement probability the probability of a transition between two candidate points is determined. In step 704 a comparison is made between the segment length and the distance between the current and previous geolocation measurements. If the distance between the current and previous geolocation measurements is not less than the segment length then the method proceeds to step 708 where the routing distance between a candidate point of the current geolocation measurement and each candidate point of the previous geolocation measurement is calculated by determining the distance that follows the topology of the road network using the routing function.

If in step 704 the distance between the current and the previous geolocation measurements are less than the segment length the method proceeds to either of steps 705, 706 or 707 depending on the position in the adapted map of the candidate point for the current geolocation measurement compared to the candidate point of the previous geolocation measurement.

If the candidate point for the current geolocation measurement is in the same segment of the adapted map as a candidate point for the previous geolocation measurement then step 705 is selected and the routing distance between these two points is set to the Euclidean (i.e. straight line) distance.

In order to determine whether steps 706 and 707 are performed the adjacency of segments that contain the candidate points has to be determined. Two segments are considered to be adjacent if the first segment is contiguous with the second segment, i.e. it immediately borders on, or is a neighbour to, the second segment. For example, when considering an un-interrupted road an adjacent segment to a current segment is the segment which is directly next to, or joined with, the current segment. In the case of a junction where a main road splits into two side roads there exist multiple adjacent segments. In this example the segments that are adjacent to the last segment of the main road before the junction are the first segments of both of the side roads and the penultimate segment of the main road.

If the candidate point for the current geolocation measurement is in an adjacent segment to a candidate point for the previous geolocation measurement then step 706 is selected and the routing distance between these two points is set equal to the Euclidean distance plus a first predetermined value.

If the candidate point for the current geolocation measurement is not in the same segment as, or in the adjacent segment to, a candidate point for the previous geolocation measurement then step 707 is performed. In step 707 the routing distance between the two candidate points is set equal to the Euclidean distance plus a second predetermined value.

The method concludes with steps 709 and 710. In step 709 p_transition is determined based on the difference between the route distance and the Euclidean distance of the two candidate points and after determining p_transition a route which maximises p_measurement and p_transition is calculated in step 710.

The result of step 710 is the most probable path of the vehicle taking into account all of the transitions between the candidate points of successive geolocation measurements. In one embodiment the number of geolocation measurements that are used for determining the most probable path is no more than a predetermined value. By determining the most probable path over a number of geolocation measurements and their associated candidate points the method is able to mitigate the long-term effects of any short-term erroneous indications. For example there might be instances (e.g. at a junction of a road) where, based on the transition probability between two candidate points alone, it could be determined that the vehicle is located on an incorrect road.

As an example, consider a geolocation measurement that positions a vehicle past a junction in between two adjacent roads. In this scenario it is possible that each of the candidate points, on each of the adjacent roads, has a high transition probability value associated with it since there exists a legitimate path following the topology of the road network to each of the candidate points. As a consequence, picking a candidate point based on comparing these two probabilities alone could lead to an erroneous result. This is mitigated by considering multiple points. As the vehicle travels along one of the roads, candidate points are generated which surround the geolocation measurements. As a result, the transition probability associated with transitions out of the incorrect candidate point to candidate points of ensuing geolocation measurements (along the correct road) will be of a low value and therefore when considering the path as a whole, the incorrect candidate point will not be selected since the other (correct) candidate point maximises the likelihood over all the points that are considered. By continually applying the route finding algorithm over the candidate points associated with multiple successive geolocation measurements the effect of one high transition probability to an incorrect candidate point will be mitigated by the low transition probabilities which result for transitions out of the incorrect candidate point In contrast to the known method of map matching shown in FIG. 3, the present method uses the adjacency information of the adapted map to weight the transition probabilities. As a result, by appropriate segmentation of the map the need to calculate the routing distance between two candidate points using a computationally intensive routing function can be avoided in certain circumstances.

The method of map matching shown in FIG. 7 describes a method of map matching where the values that are used for determining the transition probability, p_transition, are modified according to specified criteria. The method shown in FIG. 7 accelerates the method of map matching by using probabilities that are quick and efficient to calculate while still possessing the ability to convey the likelihood of one transition occurring relative to another.

In the method of FIG. 7 the transition probabilities are based on the relative position of each candidate point in a map that has been specifically adapted to reduce the amount of computation by taking into account how a user traverses the map for example; in step 701 the map is adapted such that geolocation measurements will routinely be less than one segment apart. This adaption enables the determination of a route distance, and therefore the transition probability, to be made using a penalty-based value that is influenced by a view of how a user traverses a map.

In step 705 the routing distance between a candidate point for the current geolocation measurement and a candidate point for the previous geolocation measurement is set equal to the Euclidean distance if each of the candidate points are located in the same segment. This has the effect of maximising the transition probability, since the smaller the variation between the routing distance and the Euclidean distance the higher the probability of p_transition. Using a routing distance that is equal to the Euclidean distance is in fact what would happen if the routing distance was calculated according to the topology of the map since the two candidate points have to be on the same road as they are in the same road segment and since roads are generally straight; the distance following the topology of the road network is equal to the straight-line (Euclidean) distance. By accelerating the method of map matching in this way a call to the computationally expensive routing function is avoided.

In step 706 the routing distance is set equal to Euclidean distance plus a first predetermined value when a candidate point for the previous geolocation measurement is in an adjacent segment to a candidate point for the current geolocation measurement. This first predetermined value acts as a small penalty and helps to prevent reverse movement along an already traversed road. In one embodiment the small penalty is equal to the segment length.

In step 707, if a candidate point for the current geolocation measurement is not in the same segment as, or in an adjacent segment to, a candidate point for a previous geolocation measurement then the routing distance is set equal to the Euclidean distance plus a second predetermined value which acts as a large penalty.

The roadmap is specifically adapted in this embodiment such that when a car travels along a road, each sequential geolocation measurement will likely be in the same segment as, or in adjacent segment to, the previous geolocation measurement. For this reason it is highly unlikely that the true location of the user will belong to a segment which is not the same segment as, or adjacent to, the previous geolocation measurement. Adapting the algorithm in this way enables a transition between these two candidate points to be discounted from consideration, or at least made to appear very unlikely, without the need to call a computationally expensive routing function to find the absolute value of the routing distance.

The second predetermined value used in step 707 is any value greater than the first predetermined value used in step 705. In one embodiment the second predetermined value is equal to ten times the segment length. Using a large penalty like this ensures sudden transitions across completely different roads do not occur.

Steps 705, 706 and 707 represent possible accelerations that can be made based on the configuration of the adapted map. These accelerations avoid the need to calculate the route distance using a computationally intensive routing function. The possible accelerations detailed in steps 705, 706 and 707 are only carried out when the distance between the current geolocation measurement and the previous geolocation measurement is less than the segment length however considering the segment length is chosen such that all points will normally be in the same or adjacent segments of the segmented map it is likely that a large proportion of the route distance determination is susceptible to the acceleration technique discussed above.

If on the other hand, the sequential geolocation measurements are separated by further than the segment length then the routing distance is calculated according to the topology of the road network using the routing function. As a result of the accelerations available in 705, 706 and 707 the speed of the method can never fall below that of the known method of map matching which exclusively uses a routing function.

Figure 8:
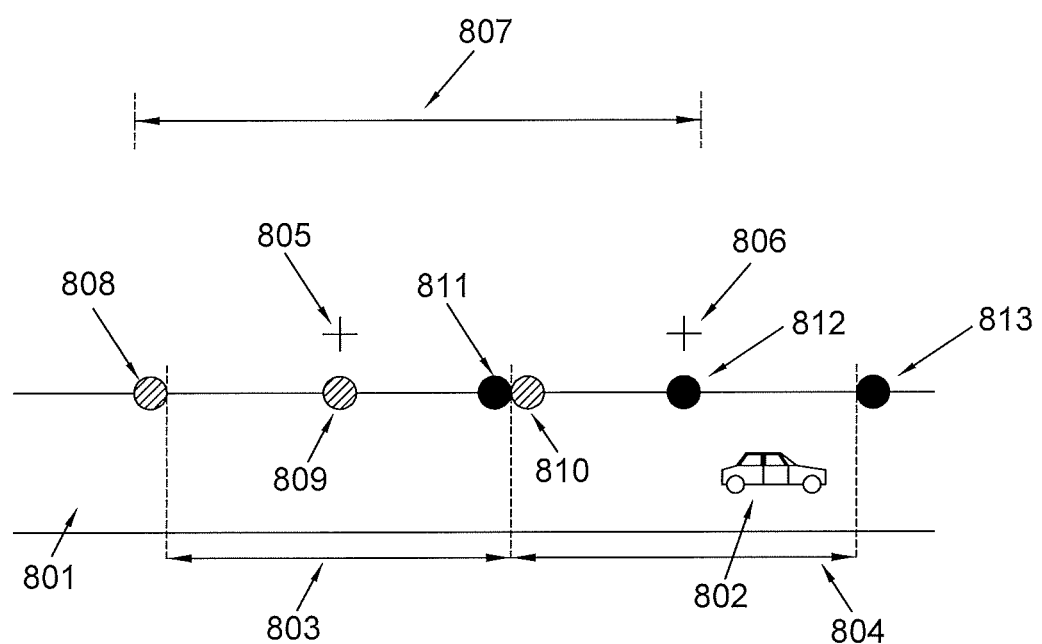
FIG. 8 shows a road map superimposed with the quantities generated in one embodiment of the accelerated method of map matching.

FIG. 8 shows a road map superimposed with the quantities generated in one embodiment of the accelerated method of map matching. FIG. 8 shows a road 801 which is being traversed by a vehicle 802. In accordance with the method described above, the road network is split into a first segment 803 and a second segment 804. FIG. 8 shows a first geolocation measurement 805 and a second geolocation measurement 806. Candidate points are generated in each segment that is less than a threshold distance 807 away from the measured geolocation measurement. For the first geolocation measurement 805; first 808, second 809 and third 810 candidate points are generated in segments which are less than the threshold distance 807 from the first geolocation measurement 805. For the second geolocation measurement 806; fourth 811, fifth 812 and sixth 813 candidate points are generated in segments which are less than the threshold distance 807 from the second geolocation measurement 806.

As an example, consider the fifth candidate point 812 of the second geolocation measurement 806. There are three candidate points for the previous geolocation measurement, 808, 809, 810 and therefore three possible transitions into the fifth candidate point 812, either from 808, 809 or 810. The probability associated with these transitions, p_transition, is determined from the difference between the route distance and the Euclidean distance. In the above method a route distance equal to the Euclidean distance is selected for the transition between 810 and 812, a route distance equal to the Euclidean distance plus a first predetermined value is selected for a transition between 809 and 812, and a route distance equal to the Euclidean distance plus a second predetermined value is selected for the transition from 808 to 812.

The method of map matching discussed above can also be further enhanced when performing retroactive map matching on large number of geolocation measurements by splitting the total set of geolocation measurements (corresponding to the journey) into multiple smaller sections for analysis.

The adapted method of map matching discussed enables a significant acceleration compared to traditional approaches, especially when a high volume of geolocation measurements are used, without sacrificing the accuracy of the traditional, computationally intensive, approach.

Figure 9:
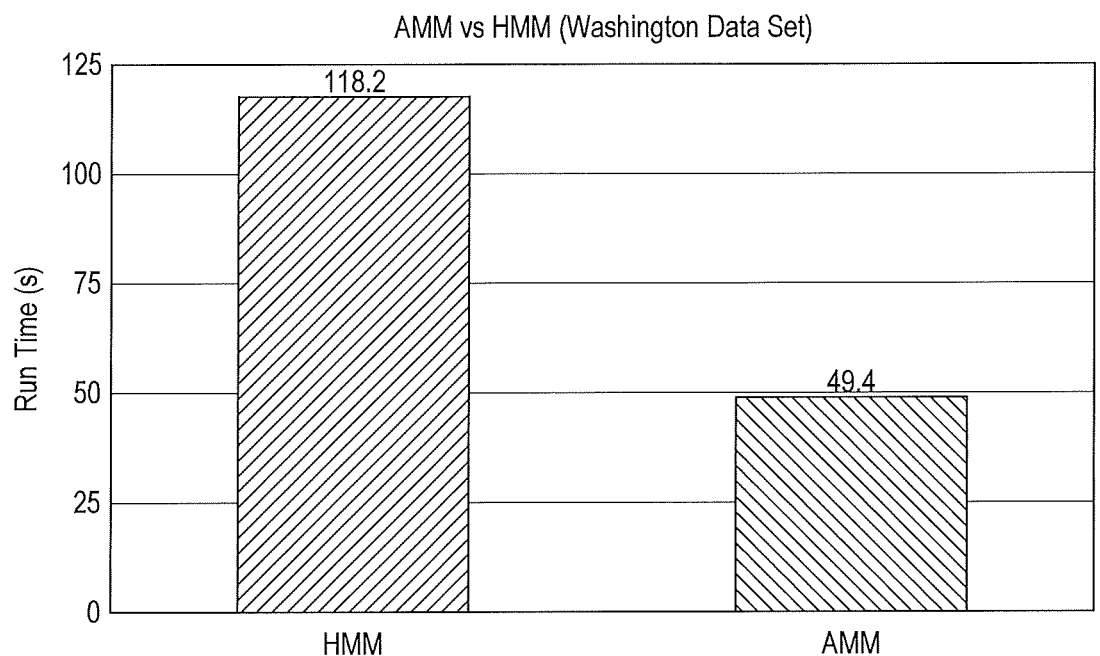
FIG. 9 shows a comparison of the computation time between a traditional method of map matching (HMM) and an accelerated method of map matching according to an embodiment (AMM)

FIG. 9 shows a comparison of the computation time between a traditional method of map matching (HMM) and an accelerated method of map matching according to an embodiment (AMM). FIG. 9 shows that the adapted algorithm enables a significant reduction in computing time when using a set of test GPS data, sampled at 1Hz, taken on a drive in Seattle, Wash., USA. This data set is often referred to as the Washington data set and is available online at https://www.microsoft.com/en-us/research/publication/hidden-markov-map-matching-noise-sparseness/. FIG. 9 shows the runtime of the traditional approach was 118.2 seconds while the run time for the adapted method of map matching was 49.2 seconds. When considering larger data sets a reduction in computation time can be achieved upwards of 90% while still processing the same amount of data as the prior art.

Figure 10:
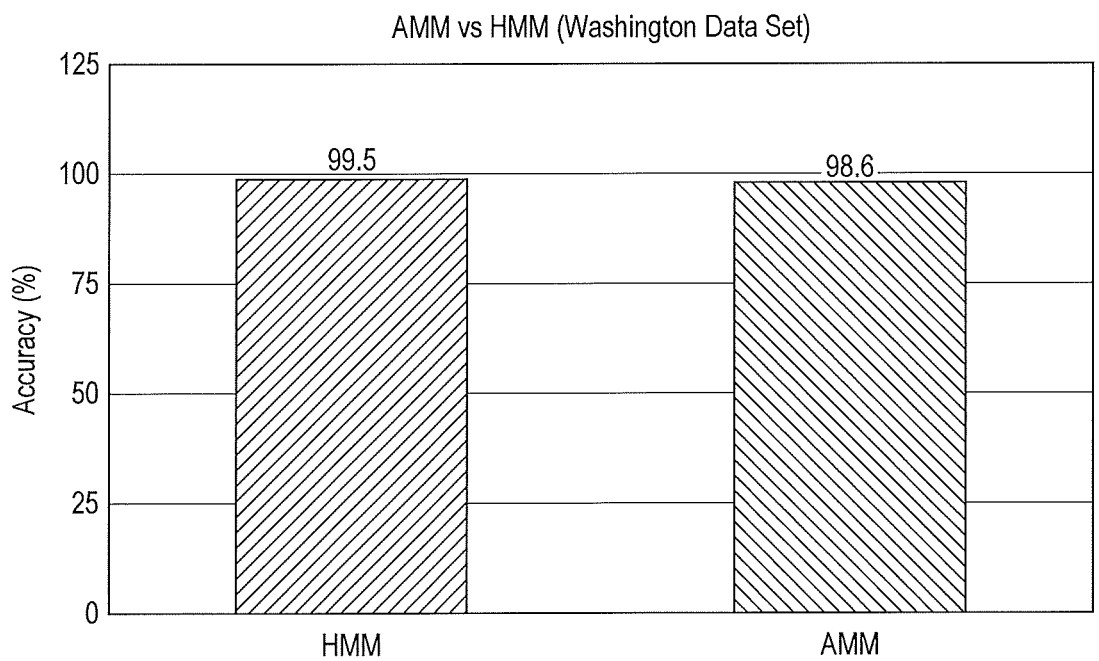
FIG. 10 shows a comparison of the accuracy between a traditional method of map matching (HMM) and an accelerated method of map matching according to an embodiment (AMM).

FIG. 10 shows a comparison of the accuracy between a traditional method of map matching (HMM) and an accelerated method of map matching according to an embodiment (AMM). FIG. 10 shows that the accuracy of the adapted algorithm (98.6%) is similar to that of the traditional method of map matching (99.5%) when using the Washington data set. This is particularly advantageous as the adapted algorithm offers broadly the same accuracy while enabling significant reductions in computation time.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer implemented method of matching a series of geolocation measurements to a map using a Viterbi algorithm by determining transition probabilities between pairs of candidate points for consecutive geolocation measurements, wherein the map comprises a plurality of paths, the method comprising:
   segmenting the map into a plurality of segments; and
       when a distance of the consecutive geolocation measurements is less than or equal to a segment length:
           determining the transition probability between two candidate points based on a Euclidian distance between the two candidate points and a route distance between the two candidate points; wherein the route distance is equal to the Euclidean distance plus a first predetermined value when the two candidate points are not in the same segment as each other.

2. A method in accordance with claim 1 wherein the first predetermined value:
   equals a second predetermined value when the two candidate points are in adjacent segments; and
   equals a third predetermined value when the two candidate points are not in adjacent segments, wherein the third predetermined value is larger than the second predetermined value.

3. A method in accordance with claim 2 wherein each segment of the plurality of segments has a segment length that is based on a maximum speed of a user and a geolocation measurement sample rate.

4. A method in accordance with claim 3 wherein the second predetermined value is equal to the segment length and/or the third predetermined value is equal to ten times the segment length.

5. A method according to claim 1 wherein a candidate point is determined by finding the closest point in a segment to a geolocation measurement.

6. A method in accordance with claim 1 further comprising:
   outputting determined positions associated with the geolocation measurements.

7. A device comprising a processor and memory, the memory storing computer program instructions executable by the processor and when executed by the processor causing the processor to match a series of geolocation measurements to a map using a Viterbi algorithm by determining transition probabilities between pairs of candidate points for consecutive geolocation measurements, wherein the map comprises a plurality of paths, the code configured to cause the processor to:
   segment the map into a plurality of segments; and
       when a distance of the consecutive geolocation measurements is less than or equal to a segment length:
           determine the transition probability between two candidate points based on a Euclidian distance between the two candidate points and a route distance between the two candidate points; wherein the route distance is equal to the Euclidean distance plus a first predetermined value when the two candidate points are not in the same segment as each other.

8. A device in accordance with claim 7, wherein the first predetermined value:
   equals a second predetermined value when the two candidate points are in adjacent segments; and
   equals a third predetermined value when the two candidate points are not in adjacent segments, wherein the third predetermined value is larger than the second predetermined value.

9. A device in accordance with claim 8, wherein each segment of the plurality of segments has a segment length that is based on a maximum speed of a user and a geolocation measurement sample rate.

10. A device in accordance with claim 9, wherein the second predetermined value is equal to the segment length and/or the third predetermined value is equal to ten times the segment length.

11. A device according to claim 7, the code further configured to cause the processor to determine a candidate point by finding the closest point in a segment to a geolocation measurement.

12. A device in accordance with claim 7 further configured to output determined positions associated with the geolocation measurements.

13. A non-transitory medium comprising computer program instructions suitable for execution by a processor, the instructions configured to, when executed by the processor, perform a method according to claim 1.

* * * * *